Feb. 19, 1963    H. O. FISCHER    3,078,062
AIRCRAFT WITH PROPELLER-DRIVE
Filed Oct. 24, 1960

INVENTOR
HANS OTTO FISCHER
BY
ATTORNEY.

3,078,062
AIRCRAFT WITH PROPELLER-DRIVE
Hans Otto Fischer, Monchen-Gladbach-Neuwerk, Germany, assignor to Rhein-Flugzeugbau G.m.b.H., Krefeld-Urdingen, Germany, a corporation of Germany
Filed Oct. 24, 1960, Ser. No. 64,447
4 Claims. (Cl. 244—65)

The present invention relates to an aircraft with propeller-drive.

It is known to design an aircraft, having a single proproller only, in such manner that the propeller turns at the rear edge of the wing unit or at the rear end of the fuselage between the fuselage and the guide unit in the symmetrical plane of the aircraft. Difficulties are encountered at times by this arrangement for the mounting of the propeller and of the propeller shaft, respectively. It is known that the propeller must be mounted as much as possible free from oscillations and must make possible a statically and dynamically favorable setting of the propeller's thrust forces. On the other hand, the guide unit or the tail of the aircraft must be connected with the fuselage resistant against buckling and against bending, in spite of the airscrew circle which must remain free. In known structures this requirement has been observed, for instance, in such a manner, that the propeller shaft is designed as a hollow shaft and the carrier for the guide unit projects through the hollow propeller shaft. This arrangement is, however, not always available.

The carrier for the guide unit is in most instances not sufficiently resistant against bending, so that the guide unit is subjected to damaging oscillations. Upon enlargement of the diameter of the carrier for the guide unit, in order to obtain a sufficient resistance against bending, the hub for the propeller must be necessarily enlarged, which is of a disadvantage and which affects the driving conditions in a disadvantageous manner.

Aircraft with wings have also been known, which have simultaneously one or two annular wings, whereby a propeller turns in each annular wing. The advantages of an annular wing are generally known. It is also not new to profile an annular wing in such a manner, that it is inwardly narrowed like a nozzle within the range of the airscrew-circle. By this arrangement, good propulsion and lifting conditions may be obtained.

In the known aircraft with annular wings, the mounting of these full ring wings is brought about by means of particular supports. Such wing unit is, however, constructively extremely complicated and statically indefinite, so that aircrafts of this type have not been accepted.

It is, therefore, one object of the present invention to provide an aircraft with propeller drive with an annular wing wherein the lower half of the annular wing is formed by the rear portion of the wing which is annularly cranked within this range. By this arrangement, the carrier for the tail unit can be secured to the lower half of the annular wing and the propeller shaft can have a full cross-section with relatively small diameter.

It is another object of the present invention to provide an aircraft with propeller drive, wherein the fuselage has within the range of the airscrew-circle a step or a section, or the fuselage terminates in front of the airscrew-circle by forming a step towards the connected carrier for the tail unit.

It is still another object of the present invention to provide an aircraft with propeller drive, wherein, in order to improve the buoyancy- and also the static-conditions, the two wings are connected in the buckling-zone with an intermediate wing substantially horizontally disposed and arranged at some distance from the fuselage and by this arrangement the wings are effectively supported relative to each other. This intermediate wing carries simultaneously at its rear edge the bearing of at least the front bearing for the propeller shaft. A vertical support is disposed behind the airscrew-circle, which support carries the upper portion of the circular arc, forming the annular wing, and rests downwardly on the carrier of the tail unit. Selectively adjustable control surfaces or pressure flaps having a horizontally disposed turning axis during normal flight are arranged simultaneously immediately behind the airscrew-circle, the rotating axle of the control surfaces or pressure flaps being mounted on the annular wing and on the mentioned vertical connecting strut. It is also possible to support simultaneously the rear bearing for the propeller shaft on this strut-like connecting member.

The present invention has its best application for aircraft, which are designed as aeroplanes with mid-set wings having wings cranked downwardly toward the fuselage, whereby then the annuar wing is disposed directly behind the relatively short fuselage, so that the propeller turns at the end of the fuselage. The lower part of the airscrew-circle is though covered over a relatively small sector by the fuselage of the aircraft by such arrangement, yet, in accordance with the present invention, the end of the fuselage is tapered down in form of a wedge or a spindle, so that the propeller, which turns immediately behind the rear end of the fuselage, receives still air over the entire turning range. By the arrangement of the composed annular wing and of the middle wing disposed in front of the annular wing which connects the main carrying wings, particularly simple structural and good statical conditions are brought about. The take-off and landing characteristics of the aircraft are found favorable, due to the fact that immediately behind the propeller, that is, within the propeller stream, two horizontal flaps are provided and because the tail unit is raised so high, that it receives air likewise fully by the propeller stream.

The arrangement of the wing unit designed in accordance with the present invention, brings about a completely new and entirely unknown type of aircraft.

With these and other objects in view, which will become apparent in the following detailed description, the present invention will be clearly understood in connection with the accompanying drawing, in which.

Figure 1:
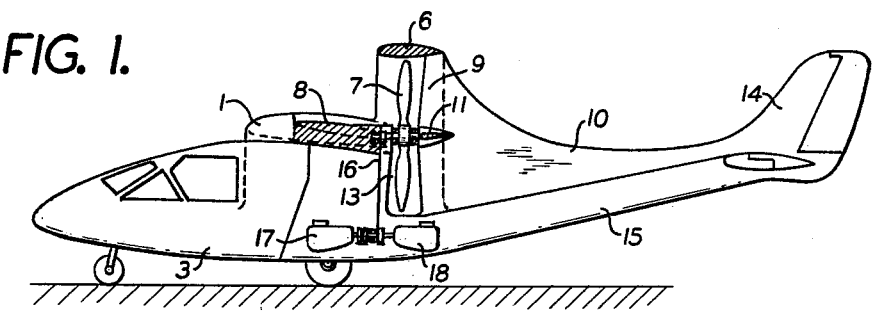
FIGURE 1 is a side elevation of the aircraft designed in accordance with the present invention, shown partly in section.

Referring now to the drawing, the aircraft has two cantilever wings 1 and 2 which are buckled downwardly towards the fuselage 3. The roots 4 and 4' of the wings 1 and 2 are curved from the buckling points 5 and 5' up to the connection with the side walls of the fuselage 3. The radius of the curve is chosen in such manner that it complements to a full circle with a circular-shaped arc piece 6 which connects the wings 1 and 2 in the buckling zone 5 and 5' and which bridges the fuselage or its extension at some distance from the latter. The arc piece 6 is rigidly connected with the wings 1 and 2 at the buckling points 5 and 5', so that this arc piece 6 form jointly with the roots 4 and 4' of the wings 1 and 2 a full annular wing, in which the propeller 7 turns, and which propeller 7 is mounted on the middle wing 8 connecting the two wings 1 and 2 approximately in a horizontal plane. The profiled annular wing, which consists of the arc piece 6 and the root portions 4 and 4', is supported by means of a vertical strut 9 in the direction of flight behind the airscrew-circle. This strut 9 carries simultaneously the rear bearing for the propeller shaft.

Figure 2:
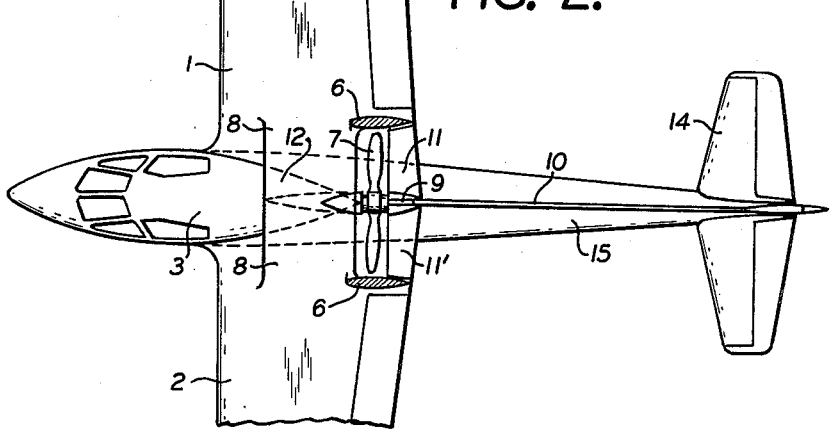
FIG. 2 is a top plan view of the aircraft shown in FIG. 1.
Figure 3:
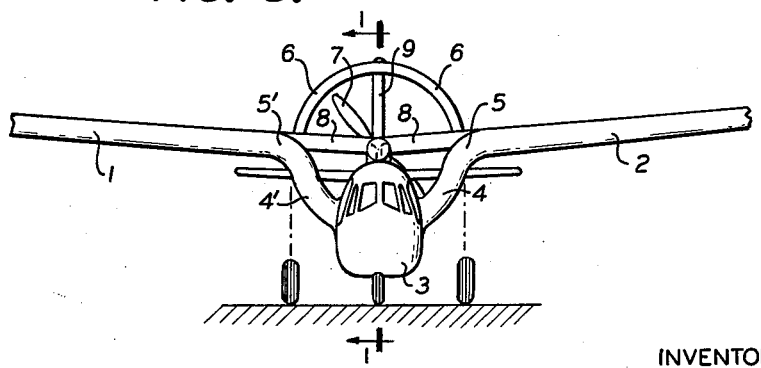
FIG. 3 is a front elevation of the aircraft shown in FIG. 1.

A narrow stabilizing surface 10 set on edge is secured to the strut 9 extending rearwardly all the way to the tail unit and is diminished obliquely rearwardly. Horizontally disposed flap bodies 11 and 11' are provided immediately behind the bearing for the propeller shaft, the swinging axle of the flap bodies 11 and 11' being mounted on the one hand on the arc piece 6 forming a part of the annular wing and on the other hand on the vertical strut 9. The end of the fuselage 12 of the aircraft is formed of wedge-shape, as clearly shown in FIG. 2, and set off in front of the airscrew-circle by forming a step 13, in such manner that the edge layer of the air flowing around the fuselage is guided without fail in the direction towards the hub of the propeller, bringing about the result, that the propeller 7 receives air completely within its total rotary range. The tail unit 14 is disposed within the range of the stream of the propeller, as may be ascertained from FIG. 1 of the drawing. The carrier 15 for the tail unit and the tail of the aircraft, respectively, extends below the airscrew-circle and is rigidly connected with the fuselage body within the zone of the bottom of the fuselage. The propeller shaft is driven, by example, by means of a V-belt 16. The V-belt 16 or a similar power transmission means is in operative connection with two, selectively coupled driving motors 17 and 18 disposed inside of the fuselage, which driving motors 17 and 18 are served with cooling air in a particularly simple manner by means of air catch pockets and air discharge openings provided in the body of the fuselage.

While I have disclosed one embodiment of the present invention, it is to be understood that this embodiment is given by example only and not in a limiting sense, the scope of the present invention being determined by the objects and the claims.

I claim:
1. A single-propeller aircraft comprising
   a fuselage having side walls,
   a pair of cantilever wings,
   the front portion of said cantilever wings being buckled downwardly towards said fuselage, to form curved roots, connected with said side walls of said fuselage,
   the rear portion of said cantilever wings including a circular-shaped arc piece connecting said cantilever wings,
   the radius of said curved roots being chosen to complement to a full circle said circular-shaped arc piece, and said arc piece forming jointly with said roots a full annular wing,
   a propeller shaft disposed in the center of said arc piece, and carrying a propeller including a hub,
   a substantially horizontal middle portion of said cantilever wings being disposed between said front portion and said rear portion thereof,
   a front bearing for said propeller shaft mounted on said middle portion of said cantilever wings,
   a vertical strut disposed in said arc piece,
   a rear bearing for said propeller shaft mounted on said vertical strut,
   a tail unit disposed in the rear of and spaced apart from said vertical strut, and
   a narrow, vertical stabilizing member connecting said tail unit with said vertical strut.
2. The aircraft, as set forth in claim 1, which includes
   a pair of horizontally disposed flap bodies behind said propeller shaft and pivotally mounted in said arc piece and said vertical strut, respectively.
3. The aircraft, as set forth in claim 1, wherein
   said fuselage has a rearwardly tapered rear end and has a downward step in front of said arc piece, thereby guiding an air flow towards said hub of said propeller.
4. The aircraft, as set forth in claim 1, which includes
   a carrier supporting said tail unit and connecting the latter with said fuselage.

References Cited in the file of this patent
UNITED STATES PATENTS

| | | |
|---|---|---|
| 2,514,478 | Custer | July 11, 1950 |
| 2,953,322 | Lewis | Sept. 20, 1960 |
| 3,017,139 | Binder | Jan. 19, 1962 |

FOREIGN PATENTS

| | | |
|---|---|---|
| 985,498 | France | Mar. 14, 1951 |